(12) United States Patent
Rolff

(10) Patent No.: US 11,630,024 B2
(45) Date of Patent: Apr. 18, 2023

(54) METHOD FOR LEAK TESTING USING A FILM CHAMBER WITH VENTILATED MEASURING VOLUME

(71) Applicant: INFICON GMBH, Cologne (DE)

(72) Inventor: Norbert Rolff, Horrem (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 16/963,493

(22) PCT Filed: Jan. 28, 2019

(86) PCT No.: PCT/EP2019/052001
§ 371 (c)(1),
(2) Date: Jul. 20, 2020

(87) PCT Pub. No.: WO2019/145535
PCT Pub. Date: Aug. 1, 2019

(65) Prior Publication Data
US 2021/0048367 A1    Feb. 18, 2021

(30) Foreign Application Priority Data

Jan. 29, 2018 (DE) ..................... 10 2018 201 313.6

(51) Int. Cl.
*G01M 3/32* (2006.01)

(52) U.S. Cl.
CPC ................................ *G01M 3/3281* (2013.01)

(58) Field of Classification Search
CPC ...... G01M 3/26; G01M 3/3218; G01M 3/329; G01M 3/36; G01M 3/363; G01M 3/3245; G01M 3/3236; G01M 3/32; G01M 3/04; G01M 3/24; G01M 3/3272
See application file for complete search history.

(56) References Cited

U.S. PATENT DOCUMENTS

| | | | | |
|---|---|---|---|---|
| 3,027,753 A | * | 4/1962 | Harder, Jr. ............ | G01M 3/027 73/49.3 |
| 11,320,337 B2 | * | 5/2022 | Rolff ........................ | G01M 3/36 |
| 2014/0007655 A1 | * | 1/2014 | Pavlik ..................... | G01M 3/26 73/46 |
| 2017/0254720 A1 | * | 9/2017 | Decker ............... | G01M 3/3218 |

FOREIGN PATENT DOCUMENTS

| | | | | |
|---|---|---|---|---|
| CN | 1323391 | | 11/2001 | |
| CN | 106537108 | | 3/2017 | |
| DE | 19846800 | | 4/2000 | |
| DE | 102014218399 | | 3/2016 | |
| WO | WO-2015056661 A1 | * | 4/2015 | ............. G01M 3/20 |
| WO | 2015/140042 | | 9/2015 | |
| WO | WO-2015140042 A1 | * | 9/2015 | ............. G01M 3/32 |

* cited by examiner

*Primary Examiner* — John Fitzgerald
*Assistant Examiner* — Truong D Phan
(74) *Attorney, Agent, or Firm* — Kirton McConkie; Whitney Blair

(57) ABSTRACT

A method for testing a test specimen for the presence of a leak using a film chamber for accommodating the test specimen, wherein the film chamber comprises walls enclosing a film chamber volume, which walls include at least one flexible wall area, comprising the steps of:
  placing the test specimen into the film chamber, and
  closing the film chamber,
characterized in that
complete closing of the film chamber is determined on the basis of the signal of a position measuring device which detects the relative position of the film chamber walls with respect to each other.

3 Claims, 2 Drawing Sheets

METHOD FOR LEAK TESTING USING A FILM CHAMBER WITH VENTILATED MEASURING VOLUME

RELATED APPLICATIONS

This application is a National State of International Application No. PCT/EP2019052001, filed Jan. 28, 2019 and entitled METHOD FOR LEAK TESTING BY MEANS OF A FILM CHAMBER HAVING A VENTED MEASUREMENT VOLUME, which claims priority to German Application No. 10 2018 201 313.6, filed Jan. 29, 2018. This application claims priority to and incorporates herein by reference the above-referenced applications in their entirety.

BACKGROUND OF INVENTION

The invention relates to a method for testing a test specimen for the presence of a leak using a film chamber.

The film chamber is a test chamber having at least one flexible wall area made from a film, for example. A typical film chamber comprises two film layers which are placed one against the other around the test specimen for completely enclosing the test specimen. The film chamber is hermetically closed and evacuated when the test specimen has been accommodated therein. Subsequently, the pressure change in the film chamber volume area outside the test specimen is monitored, wherein a pressure increase is considered an indication of a leak in the test specimen. Alternatively to monitoring the pressure in the film chamber volume, the flexible wall area can be monitored, wherein a change in the flexible wall area or the film can indicate a leak. Such a method is known from DE 10 2012 200 063 A1.

In DE 10 2014 218 399 A1 a film chamber for a gross leak test on a test specimen is described, which film chamber comprises a measuring volume adjacent to a flexible wall area on the side opposite the flexible wall area in the film chamber volume. The measuring volume is hermetically sealed towards the film chamber volume. In an exemplary embodiment, where the film chamber comprises two flexible wall areas each in the form of a film, a measuring volume is provided adjacent to each of the two films. In the described method, the closed film chamber containing the test specimen is evacuated, wherein already during evacuation of the film chamber, the measuring volume is monitored for obtaining the size of a possible leak in the test specimen on the basis of the monitoring result. Monitoring of the measuring volume can be performed by measuring the pressure in the measuring volume or by measuring the gas flow in the film chamber or discharged from the film chamber.

When a test specimen having a gross leak is tested in this manner, at least a portion of the test specimen is evacuated during evacuation of the film chamber. The flexible wall area between the film chamber volume and the measuring volume causes the measuring volume to increase. The increase in the measuring volume is larger than in the case of a tight test specimen or in the case of a test specimen having a smaller leak. In the case of a tight test specimen, merely the film chamber volume in the area outside the test specimen is evacuated. In the case of a test specimen having a gross leak, the test specimen or at least a portion of the test specimen volume is also evacuated such that a larger volume is evacuated than in the case of a tight test specimen. Thus, the larger the leak in the test specimen, the larger the volume expansion of the measuring volume. On the basis of the expansion of the measuring volume and/or the flexible wall area, the size of a possible leak in the test specimen can be obtained.

It is an object of the invention to detect complete closing of the test chamber.

The method according to the invention is defined by the features of claim 1.

Complete closing of the film chamber is determined on the basis of the signal of a position measuring device which detects the relative position of the film chamber walls with respect to each other. Thus, complete closing can be determined and the starting point for the beginning of the evacuation can be set. Further, it is possible to find out whether a measuring signal indicating a leak actually results from a leak in the test specimen or a film chamber which is not closed. In the case of a film chamber still open, a gas flow from the film chamber is taken in, during evacuation, from the atmosphere surrounding the film chamber. For preventing the intake of gas from the environment of the film chamber from being erroneously regarded as a leak in the test specimen, the signal of the position measuring device is used. Only when the signal of the position measuring device indicates that the film chamber is completely closed, a measuring signal indicating a leak in the test specimen is considered a leak in the test specimen.

According to a preferred aspect of the invention, complete closing of the film chamber is determined by a) measuring the pressure in the measuring volumes and monitoring whether the measured pressure exceeds a predefined threshold value, and b) detecting the relative position of the film chamber walls with respect to each other on the basis of the measuring signal of a position measuring device.

The closed state of the film chamber is detected when the pressure measuring signal as per a) and the position measuring signal as per b) have been obtained in combination. Thus, the invention is based on the idea that the closed state of the film chamber is detected when two independent signals indicating the closed state are obtained in combination, namely the corresponding measuring signal of the pressure measuring device and the signal of the position measuring device. The risk of false detection of the closed state on the basis of the pressure measuring signal obtained when the film has been inadvertently touched, without the film chamber being closed, can thus be avoided. Further, the accuracy of detection of the closed state as compared to merely taking measurements by means of only a position measuring device as per b) is increased by additionally taking into consideration the pressure surge occurring when closing the film chamber walls, that is when the seals of the film chamber contact each other. If a small residual gap remains between the film chamber seals, although the position measuring device is already generating a contact, no pressure surge occurs.

BRIEF DESCRIPTION OF FIGURES

Hereunder an exemplary embodiment of the invention will be explained in detail with reference to the Figures in which.

DETAILED DESCRIPTION OF THE INVENTION

Figure 1:
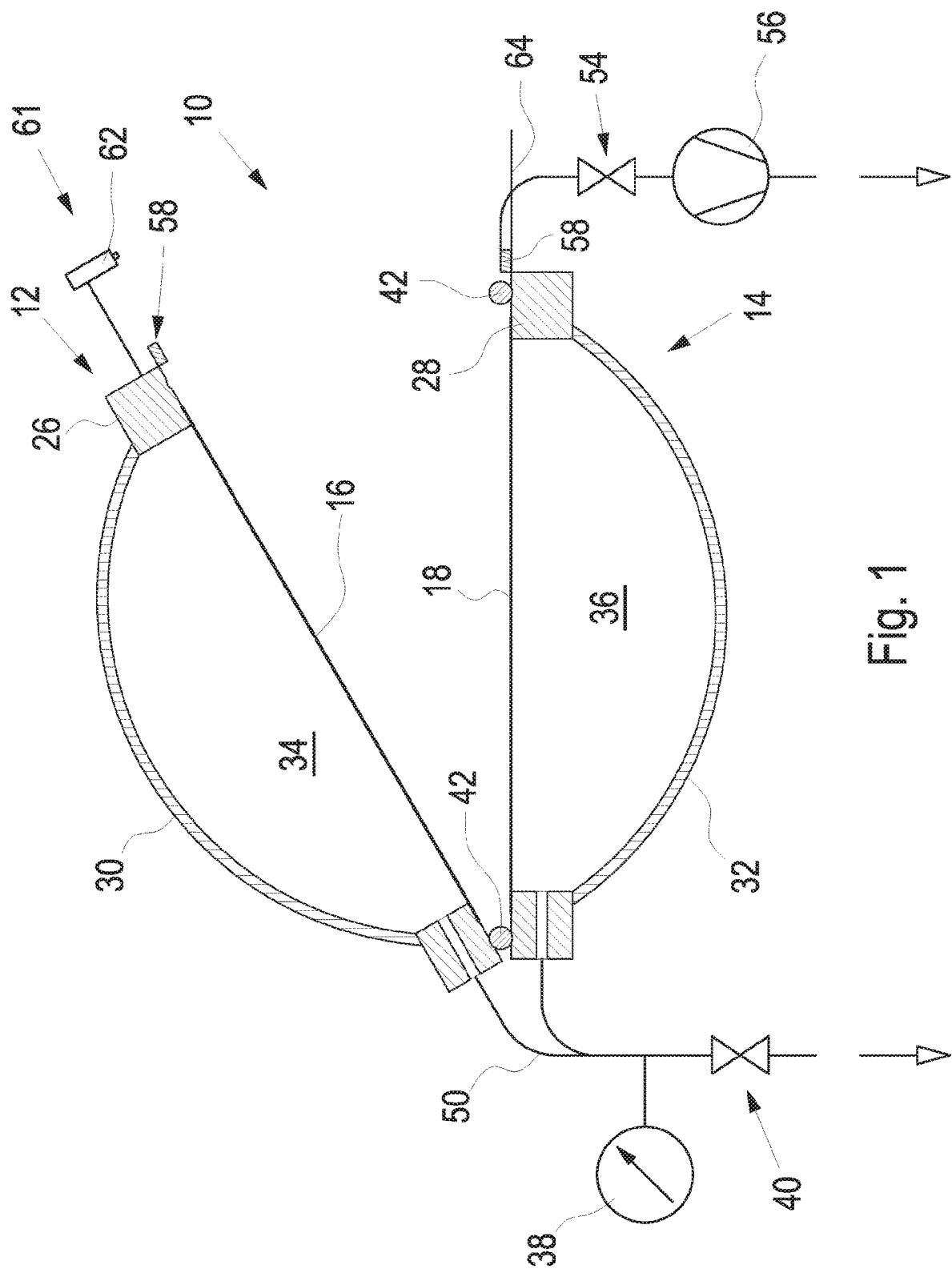
FIG. 1 shows the film chamber in the open state.

The film chamber 10 illustrated in the Figures comprises an upper cover 12 and a lower cover 14. An essential element of the upper cover 12 is the upper film layer 16, and an essential element of the lower cover 14 is the lower film layer 18. In the closed state of the film chamber (see FIG. 2), the two film layers 16, 18 enclose a test specimen 22 contained in the film chamber volume 20.

Each one of the two film layers 16, 18 comprises, on its side facing the film chamber volume 20, a non-woven material, not illustrated in the Figures, as a gas-conducting layer. Each film layer 16, 18, together with the non-woven material not illustrated, forms the respective flexible wall area of the film chamber 10.

The films 16, 18, in the area of their outer edges, are each gastightly connected to a measuring chamber ring 26, 28. The film layer 16 thus hermetically closes the lower end of the measuring chamber ring 26 facing the film chamber. The lower film layer 18 correspondingly closes the upper end of the lower measuring chamber ring 28 facing the film chamber volume 20. The end of the each measuring chamber ring 26, 28 respectively opposite the corresponding film layer 16, 18 is hermetically closed by a measuring chamber cover 30, 32.

The measuring chamber cover 30, the measuring chamber ring 26 and the film layer 16 thus enclose an upper measuring volume 34, and the film layer 18, the measuring chamber ring 28 and the measuring chamber cover 32 enclose a lower measuring volume 36. The measuring volumes 34, 36 are hermetically sealed towards the film chamber volume 20 and the outer atmosphere surrounding and the film chamber 10. Via a gas-conducting connection, e.g. a flexible tube not illustrated in the Figures, the measuring volumes 34, 36 are connected to each other in a gas-conducting manner for causing a constant pressure balance between the measuring volumes 34, 36.

Each measuring volume 34, 36 is connected to a gas line path 50 via a gas-conducting duct 46, 48 in the respective measuring chamber ring 26, 28. The gas line path 50 includes a pressure measuring device 38 by means of which the pressure in the two measuring volumes 34, 36 of the measuring chambers can be measured. Further, the gas line path 50 includes a controllable ventilation valve 40 which connects the gas line path 50 and the measuring volumes 34, 36 with the atmosphere externally surrounding the film chamber 10. In the closed state of the ventilation valve 40, the measuring volumes 34, 36 are hermetically sealed towards the atmosphere, and in the open state of the ventilation valve 40, they are connected with the atmosphere in a gas-conducting manner.

Between the two film layers 16, 18, in the area of the outer edge, a sealing ring 42 is provided which creates a gastight connection between the film layers 16, 18 in the closed state of the film chamber 10.

The film chamber 10 is connected to a vacuum pump 56 via an evacuation line 52 which includes a valve 54, said vacuum pump evacuating the film chamber volume 20 towards the external atmosphere. The vacuum line 52 is connected to a vacuum duct 60 formed between the two measuring chamber rings 26, 28 via a vacuum connection 58.

FIG. 1 shows the film chamber 10 in the open state. The film chamber volume 25 is freely accessible for placing the test specimen 22 into the film chamber volume 20. Subsequently, the film chamber 10 is closed and the film chamber volume 20 is evacuated by means of the vacuum pump 56 such that the films 16, 18 tightly cling to the test specimen 22.

At the latest after placing the test specimen 22 into the film chamber 10 and before closing the film chamber 10, the ventilation valve 40 is closed such that the measuring chamber volumes 34, 36 are hermetically sealed towards the atmosphere when the pressure in the measuring chamber volumes 34, 36 measured by means of the measuring device 38 does not exceed a predefined threshold value. This threshold value is selected such that in the case of a relatively small test specimen the films 16, 18 are pressed to the test specimen and cling to the outer contour of the test specimen. In the case of a relatively large test specimen, the pressure in the measuring volumes 34, 36 measured by means of the measuring device 38 increases and exceeds the threshold value, whereby the ventilation valve 40 is automatically opened. For this purpose, the pressure measuring device 38 and the ventilation valve 40 are connected to an electronic control device not illustrated in the Figures for the sake of clarity, which control device detects the pressure measured by means of the measuring device 38 and compares it to the threshold value, and when the threshold value is exceeded it automatically opens the ventilation valve 40, and when the threshold value is not reached it closes the ventilation valve 40 again.

With the aid of the pressure sensor of the measuring device 38 the pressure in the measuring volumes 34, 36 can be monitored during evacuation of the film chamber 10 for determining, on the basis of the pressure course, whether the test specimen has a gross leak. Alternatively, the gross leak detection can be performed by measuring the gas flow in the film chamber volume 20 or the gas flowing out of the film chamber volume 20 via the vacuum line 52.

In prior art, the ventilation valve 40 was closed for pressure measurement in the measuring chambers and opened in the case of large test specimen. In the intervals between the measurements, the film 16, 18 was balanced into the pressureless state, where the air flowed into in the measuring chamber volumes 34, 36. When a large test specimen was placed into the film chamber, the air had to be pressed out via the flexible tubes of the gas line path 50 and the ventilation valve 40, which entailed a time delay and an effort on the part of the user.

According to the invention, the ventilation valve 40 is closed and opened only when the pressure in the measuring volumes 34, 36 becomes too large, i.e. exceeds a predefined threshold value. If a large test specimen 22 is placed into the film chamber 10, the pressure increases when the film chamber 10 is closed until it exceeds the threshold value and the ventilation valve 40 is automatically opened. Then, as before, excessive air can flow out of the measuring chambers and the measuring volumes 34, 36, respectively, until the film chamber 10 can be completely closed. The ventilation valve 40 remains closed during the measurement and during the subsequent removal of the test specimen 22. When another test specimen is placed into the film chamber, the air need not be pressed out of the measuring chamber volumes 34, 36 since the air has already been pressed out and no further air has flown into the measuring chamber volumes 34, 36 due to the closed ventilation valve 40. Only when the first test specimen for a plurality of measurements on different test specimens is placed into the film chamber, the amount of gas in the measuring chamber volumes 34, 36 must be adjusted in a conventional manner.

This offers the advantage that during subsequent measurements of different test specimens, excessive air need not be actively pressed out of the measuring chamber volumes each time another test specimen is placed into the film chamber. Since the films 16, 18 cling to the test specimen 22 when the film chamber 10 is closed, the film chamber 20 can also be evacuated more rapidly than with the conventional method. The invention thus offers the crucial advantage that subsequent measurements of different test specimens can be performed more rapidly than before.

Figure 2:
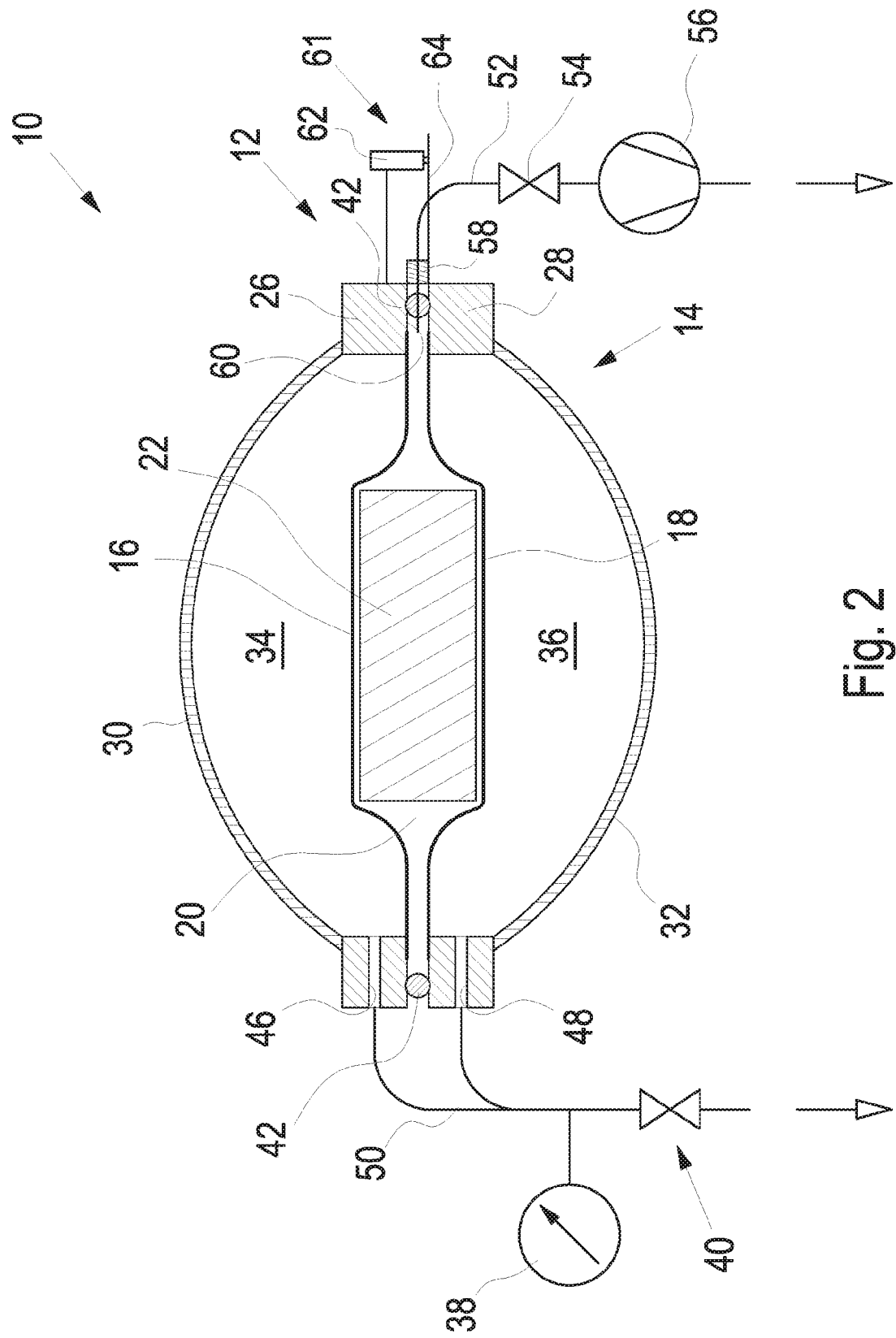
FIG. 2 shows the film chamber in the closed state with the test specimen placed therein.

The film chamber 10 is provided with a position measuring device 61 which is configured for determining the open and the closed state, respectively, of the film chamber 10. For this purpose, a contact switch 62 is fastened to the upper cover 12 via the upper measuring chamber ring 26. Correspondingly, a contact element 64 is arranged at the lower measuring chamber ring 28 and thus at the lower cover 14 such that the contact switch 62, in the closed state of the film chamber 10 illustrated in FIG. 2, is pressed against the contact element 64 and thus actuated. Actuation of the contact switch 62 indicates the closed state of the film chamber 10. In the open state illustrated in FIG. 1, the contact switch 62 is not actuated, which indicates the open or not completely closed state of the film chamber 10.

The invention is based on the idea that the closed state of the film chamber 10 is detected only when two independent signals indicating the closed state are received in combination, namely the corresponding measuring signal of the pressure measuring device 38 and the signal of the position measuring device 61.

The pressure measuring device 38 measures the pressure in the measuring volumes 34, 36 when the film chamber 10 is being closed and compares the measured pressure to a predefined threshold value. The threshold value is selected such that the pressure surge produced when the film chamber is being completely closed is detected in the measuring volumes 34, 36. This means that a temporary overpressure in the measuring volumes 34, 36 occurring when the film chamber 10 is being closed and the measuring chamber rings 26, 28 touch the seal 42 exceeds the threshold value.

However, since a pressure suddenly acting on the films 16, 18 also results in a pressure surge in the measuring volumes 34, 36, the signal of the measuring device 38 can indicate the closed state of the film chamber 10 even when the film chamber 10 is not closed.

In order to avoid this, the signal of the position measurement device 61 is additionally evaluated. When the contact of the switch 62 is closed and when at the same time the pressure measured by the pressure measurement device 38 exceeds the defined threshold value, it is assumed that the measured pressure surge has been triggered by the closing of the film chamber 10 and not by touching the films 16, 18, for example.

If only the signal of the position measuring device 60 is evaluated as an indication of the closed state of the film chamber 10, the closed state could be erroneously detected although a small gap remains between a measuring chamber ring 26, 28 and the seal 42. Only the pressure surge produced upon contacting the seal 42, that is when the film chamber 10 is completely closed, and the associated exceeding of the threshold value of the pressure measuring signal are regarded, when the switch 62 is actuated, as an adequate indication that the film chamber 10 has been completely closed.

In some operating modes the ventilation valve 40 is closed during the volume measurement. Here, a larger pressure surge occurs in the pressure measuring device 38 than in the case of an open ventilation valve 40. When the ventilation valve 40 is open, the air can escape from the measuring volumes 34, 36 with a smaller pressure loss. In order to still allow for reliably starting the evacuation of the film chamber volume 20 and the monitoring of the measuring volumes 34, 36, the pressure threshold value is adapted to the pressures expected when closing the film chamber 10. The evacuation of the film chamber volume 20 and the monitoring of the measuring volumes 34, 36 are automatically started by a control device not illustrated in the Figures when both the position measuring device 61 indicates the closed position and the pressure surge in the measuring volumes 34, 36 resulting from the closing operation is measured. For this purpose, the control device is connected to the position measurement device 61 and the pressure measuring device 38 for detecting and processing their measuring signals. The control device is also connected to the vacuum pump 56 for automatically starting the vacuum pump 56 for evacuating the film chamber volume 20 when the film chamber 10 has been closed.

The invention claimed is:

1. A method for testing a test specimen for the presence of a leak using a film chamber for accommodating the test specimen, wherein the film chamber comprises walls enclosing a film chamber volume, wherein the walls include at least one flexible wall area, the method comprising:
    placing the test specimen into the film chamber, and closing the film chamber,
    wherein during a process of closing the film chamber, complete closing of the film chamber is determined based on a position measuring signal of a position measuring device which detects a relative position of the film chamber walls with respect to each other, wherein a measuring volume is provided adjacent to said flexible wall area, wherein the measuring volume is configured to be to be arranged on a side of the flexible wall area opposite the film chamber volume and hermetically sealed towards the film chamber volume, wherein the measuring volume is monitored in order to obtain a size of a possible leak in the test specimen based on a monitoring result, and the complete closing of the film chamber is detected by measuring a pressure in the measuring volume and by monitoring whether the measured pressure exceeds a predefined threshold value in order to measure a pressure surge occurring when the walls of the film chamber close, wherein a closed state of the film chamber is detected only when a pressure measuring signal indicates the pressure surge occurring when the walls of the film chamber close and the position measuring signal of the position measuring device corresponds to the closed state, wherein the closed state of the film chamber is detected only when the pressure measuring signal and the position measuring signal both detect the closed state in combination.

2. The method according to claim 1, wherein evacuating the film chamber and/or monitoring the measuring volume are automatically started after it has been determined that the film chamber is closed.

3. The method according to claim 1 wherein the closed state of a film chamber is not detected when the pressure measurement is indicative of the closed state, while the position measurement is not indicative of the closed state, and wherein the closed state of the film chamber is not detected when the position measurement is indicative of the closed state while the pressure measurement is not indicative of the closed state of the film chamber.

* * * * *